(No Model.)
M. F. FLYNN.
CLOSED CONDUIT ELECTRIC RAILWAY.
No. 548,976. Patented Oct. 29, 1895.
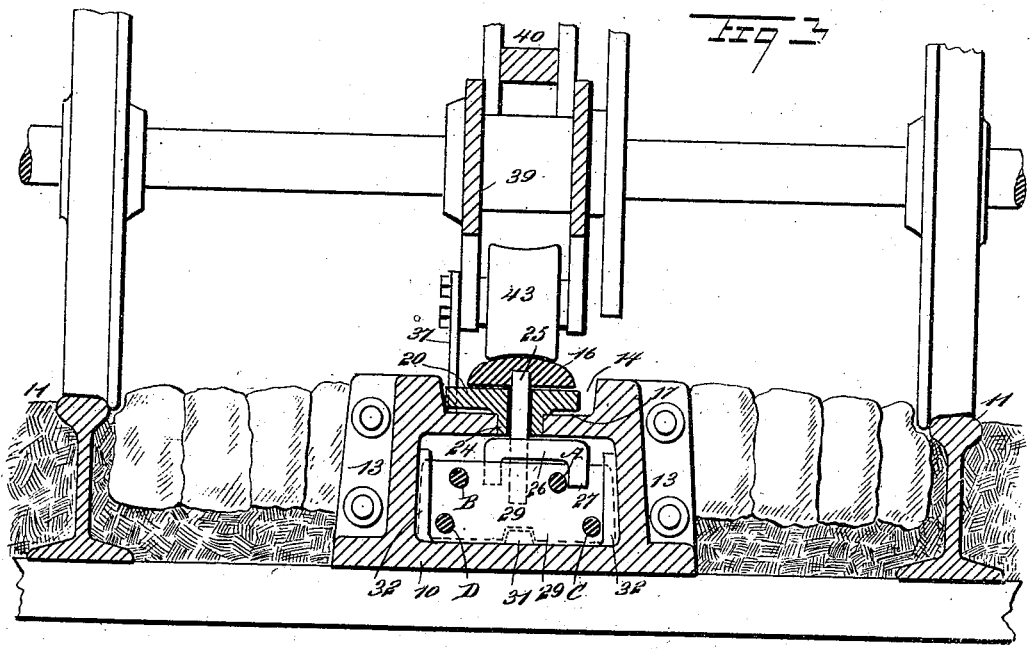
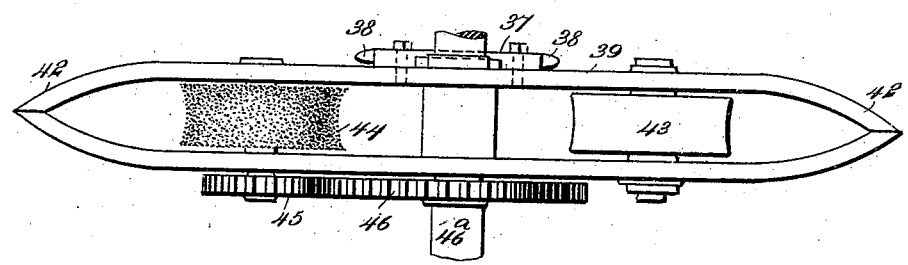
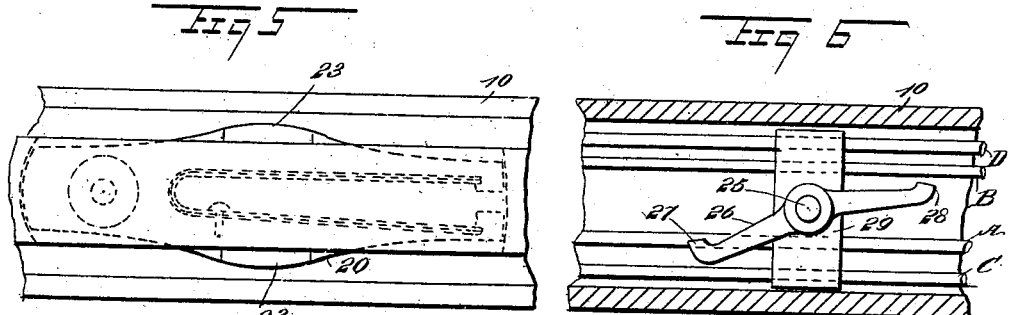
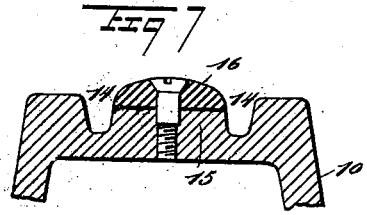
WITNESSES:
H. Walker
W. P. Hutchinson
INVENTOR
M. F. Flynn
BY
Munn & Co
ATTORNEYS.

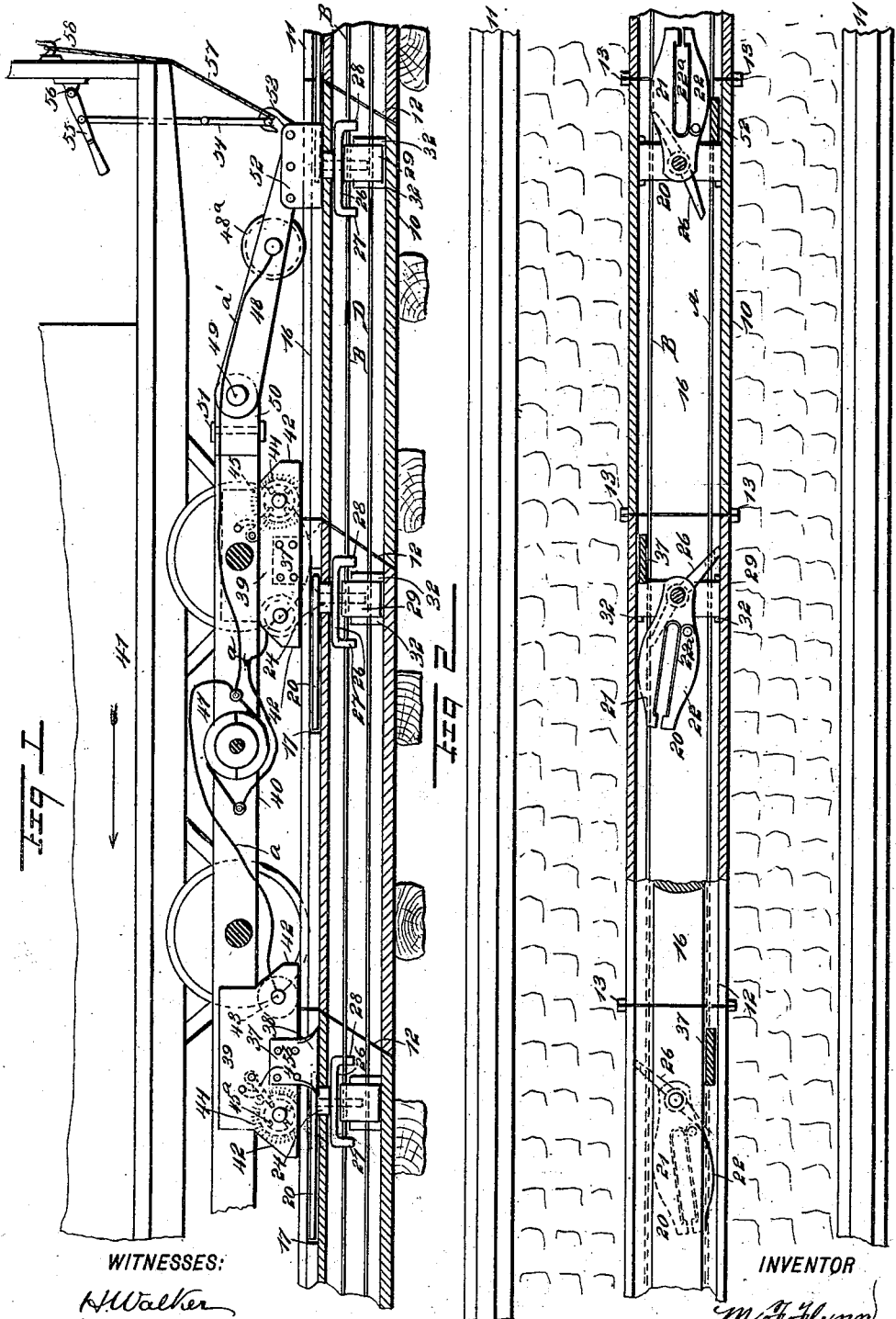

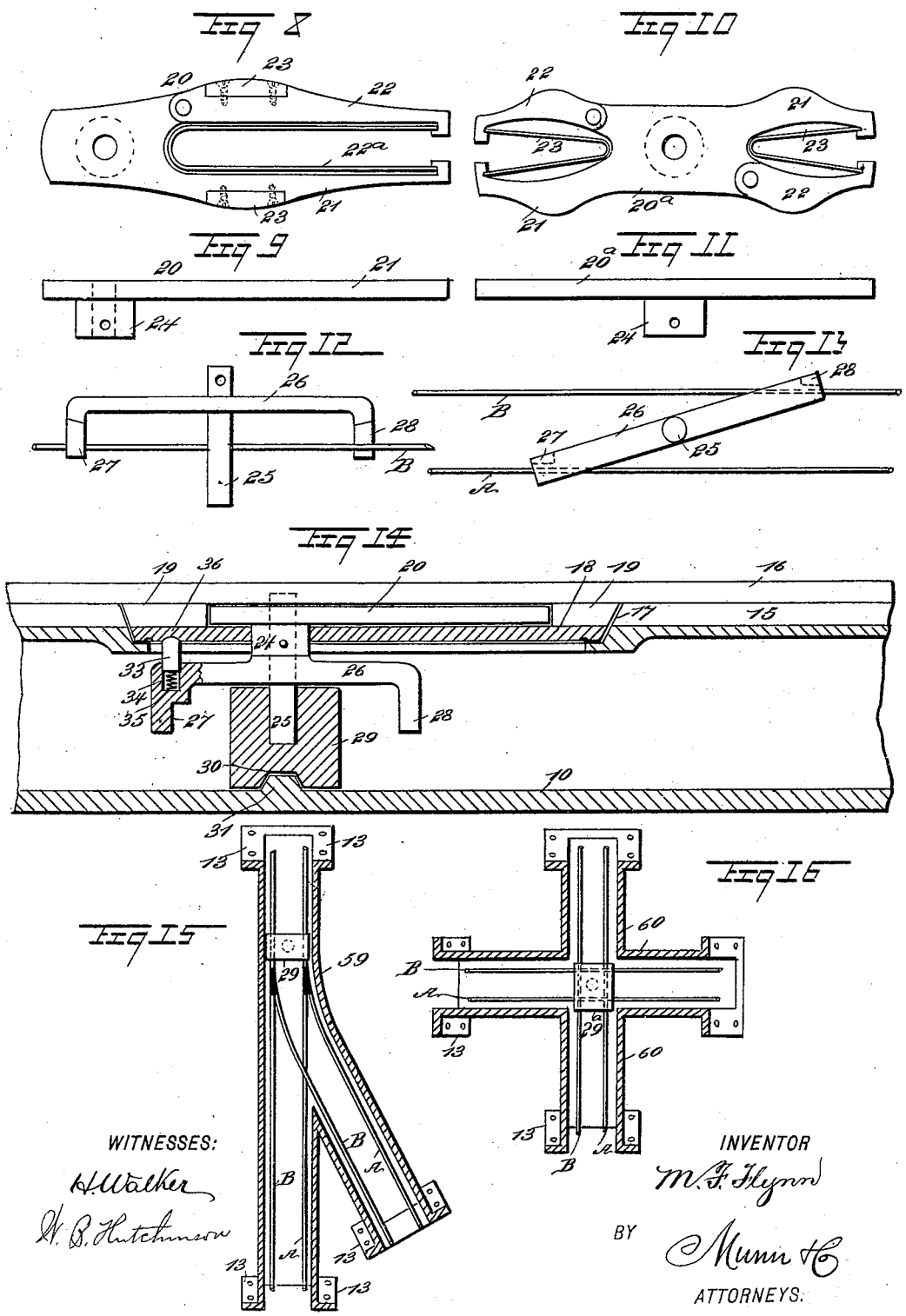

UNITED STATES PATENT OFFICE.

MICHAEL F. FLYNN, OF STAMFORD, CONNECTICUT.

CLOSED-CONDUIT ELECTRIC RAILWAY.

SPECIFICATION forming part of Letters Patent No. 548,976, dated October 29, 1895.

Application filed November 27, 1894. Serial No. 530,115. (No model.)

*To all whom it may concern:*

Be it known that I, MICHAEL F. FLYNN, of Stamford, in the county of Fairfield and State of Connecticut, have invented a new and Improved Conduit Electric Railway, of which the following is a full, clear, and exact description.

My invention relates to improvements in that class of electric railways known as "closed-conduit" electric railways, in which the supply and feed wires are carried in a closed conduit and switching devices are used to intermittently supply a contact above the conduit.

The object of my invention is to produce a comparatively cheap and simple railway of this kind, which is constructed in such a manner that under normal conditions the contact-rail on the conduit will be completely cut out, so that there is no danger of accidents from accidental contact with the said rail; also, to construct the conduit so that it may be easily laid and its contained wires perfectly insulated, to provide simple switching devices to connect the contact-rail with the supply-wires in the conduit, to produce mechanism on the car which is adapted to automatically engage the conduit devices and work the switches, and to arrange the switch-operating cams or devices so that they will positively operate the switches, but will yield under excessive strain, as in case some obstruction comes in contact with them, so that there is no likelihood of their being broken.

To these ends my invention consists of certain features of construction and combinations of parts, which will be hereinafter described and claimed.

Reference is to be had to the accompanying drawings, forming a part of this specification, in which similar letters and figures of reference indicate corresponding parts in all the views.

Figure 1 is a broken longitudinal section of the conduit to contain the mechanism and the trolley and car devices used in connection with the conduit. Fig. 2 is a broken plan view, partly in section, of the conduit and the switching mechanism. Fig. 3 is a cross-section through the conduit and the trolley. Fig. 4 is a plan view of a portion of the trolley, showing a preferred means of actuating the trolley-brush for cleaning the contact-rails. Fig. 5 is a detail plan view showing a switch-actuating cam in its normal position. Fig. 6 is a detail sectional plan showing one of the switches and the feed and line wires. Fig. 7 is a detail cross-section of the upper portion of the conduit. Fig. 8 is a detail plan view of the preferred form of switch-actuating cam which is struck by one of the plows on the car. Fig. 9 is a side elevation of the said cam. Fig. 10 is a plan view of a modified or double-ended form of the switch-operating cam. Fig. 11 is a side elevation of the device shown in Fig. 10. Fig. 12 is a detail plan view of one of the switch-arms and its support, the arm being shown in conjunction with a line-wire. Fig. 13 is a plan view of the switch-arm and accessory devices shown in Fig. 12. Fig. 14 is a detail broken longitudinal section of the conduit and one of the switches complete. Fig. 15 is a sectional plan of a form of conduit-section used at a Y, and Fig. 16 is a sectional plan of a conduit-section used where two conduits cross at right angles.

The conduit 10 is laid, preferably, at a point midway between the track-rails 11, although it may be laid at any desired point parallel with the rails, and it is made up of a series of sections insulated from each other and preferably provided with inclined meeting ends 12, although these ends may be perpendicular, if desired. The inclined ends of the conduit-sections prevent to a great extent the entry of water into the conduit at the joints between said sections. The conduit-sections have flanges 13 at their meeting ends in order that the sections may be conveniently bolted together.

The side walls of the conduit are projected upward slightly above the conduit-top, as shown clearly in Fig. 7, so as to assist in forming the parallel grooves, which are produced on the opposite sides of the raised central portion 15 of the conduit, which raised portion forms a bed for the contact-rail 16, which is made up of a series of sections, and the conduit-rail is preferably rounded on the top in order that it may make a nice contact with the trolley-wheel, as hereinafter described.

The conduit is adapted to rest on the ties of the road or may be supported on any suitable chairs.

At necessary intervals the central part of the conduit-top is recessed, as shown at 17, to provide for the movement of the striking switch-cam 20, which is preferably made as shown in Figs. 8 and 9, and, as here shown, the cam is provided with opposite parallel arms 21 and 22, the former being rigid and the latter pivoted, and the arms are pressed apart by a spring 22$^a$, which is stiff enough to cause both arms to swing together in unison when either is struck unless a serious obstruction is in the path of either arm, in which case the yielding of the spring will prevent the cam from being broken.

The arms 21 and 22 are convex on their outer sides, so that when the cam as a whole lies parallel with the contact-rail 16, which extends over it, the said convex portions extend beyond the edges of the rail and into the grooves 14, so as to be struck by the trolley-plows which travel in said grooves. The parts of the cams which are struck by the plows are provided with steel plates 23, which are fastened to them and which are hardened, so as to resist the constant wear to which they are subjected; but it will of course be understood that these portions of the cam-arms may be hardened and made integral with the said cam-arms.

The cam 20 has on its under side and near one end a depending broad journal 24, which turns in the section 18 of the conduit, (see Fig. 14,) this section being adapted to fit into the recess 17 in the conduit-top and having at its ends and on the top face short sections 19, which form continuations of the bed 15. The journals 24 are adapted to receive the switch-shafts 25, which are fastened to the journals and preferably extend up into the contact-rail 16, while they also extend well down into the conduit and into insulating-blocks, to be presently described.

Each shaft 25 carries a switch-arm 26, which extends from diametrically-opposite sides of the shaft and has depending contact-lugs 27 and 28 at opposite ends, which are adapted to contact with the line-wires A and B in the conduit, and while the said lugs are shown each in a single piece it will be understood that they may be forked and straddle the wires, if desired. The said wires A and B are held in insulating-blocks 29, which are arranged at necessary intervals in the conduit and may be supported in any convenient way, the blocks, as shown, being hung on the lower ends of the shafts 25 and having bottom recesses 30 to receive lugs 31 on the conduit-bottom, these lugs preventing the displacement of the blocks. The blocks may also be held between ribs 32 (see Figs. 2 and 3) on the sides of the conduit. It will be understood, however, that these blocks may be held in any convenient way.

By reference to Fig. 13 it will be seen that the switch-arm 26 may be held so that neither lug 27 nor 28 will touch a wire A or B, and when in this position it is of course apparent that no current can pass to the contact-rail 16. To provide for normally locking the switch in this position, the switch-arm has on its upper side a pawl 33, which lies in a recess 34 and is pressed upward by a spring 35, so as to engage a notch 36 on the under side of the section 18 of the conduit. This notch is rounded and the spring 35 is sufficiently heavy to cause the pawl to fit the notch, so as to prevent the switch from being turned by means of any ordinary tampering with the cam 20; but when the cam is struck by a plow of the car the pressure is heavy enough to overcome the tension of the spring 35 and move the switch-arm.

The insulating-blocks 29, besides supporting the line-wires A and B, also support the feed-wires C and D, which may at necessary intervals be connected with the line-wires in any usual way.

The cams 20 of the switches are struck by plows 37, carried by the trolleys 39, and these plows have their lower portions curved slightly, as shown at 38 in Figs. 1 and 4, so that as they run along the grooves 14 they will clean out the said grooves. The plows 37 are carried on trolley-frames 39, which are supported on the framework 40 beneath the car 41, and this frame may be of any usual kind and may constitute a part of the truck-frame. The trolley-frames 39 are arranged near the front and rear ends of the car, and the plows 37 are on opposite sides of the said frame, so that one plow striking a cam 20 will throw the cam in one direction, while the other throws the cam back in the opposite direction. In this way the forward plow 37, striking a cam 20, will move the cam and the switch-arm 26, so as to bring the lug 27 into contact with the wire A, while the next plow 37 strikes the next cam behind and moves the switch or arm connected therewith, so that the lug 28 contacts with the wire B, and thus a circuit is completed, as will presently appear.

The trolley-frames 39 are at front and rear formed into scrapers 42, as best shown in Fig. 4, which, fitting closely over the contact-rail 16, throw off any obstruction which may be on the rail. Each frame 39 carries a trolley-wheel 43, which runs on the contact-rail 16, and the said frame also carries a brush 44, which is placed in front of the trolley-wheel and is adapted to thoroughly clean the rail in order that a good contact may be made therewith. This brush is preferably revoluble, and, if desired, it may be connected by gears 45 and 46 with the driving-shaft 46$^a$, as in Fig. 4, and the driving-shaft may be turned in any convenient way. As shown in Fig. 1, however, the brush is revoluble, but is provided with notches 45$^a$ to engage a pawl 45$^b$ on the frame 39, and thus when the brush has been worn on one side it may be turned over a little and fastened, so as to bring it in contact with the rail.

The trolley-wheels connect by a wire $a$ with the motor 47 on the car, and when the switches are shifted, as described above, so as to bring the lug 27 of one into contact with the wire A and the lug 28 into contact with the wire B, a circuit is completed, which is as follows: from the wire A, through the lug 27, switch-arm 26, shaft 25, rail 16, trolley-wheel 43, wire $a$, motor 47, second wire $a$, the rear trolley-wheel 43, the rail, the rear switch, and lug 28 to the wire B.

Projecting from the ends of the framework 40 are arms 48, which connect with the said frame by a hinge comprising the horizontal pintle 49, the block 50, carrying it, and the vertical pintle 51, connecting the block and the frame, so that the arm may swing around a curve or may readily follow a curve and may also be lifted vertically. The arm 48 carries a shift plate or plow 52, which is adapted to follow in a groove 14 of the conduit and strike the cams 20 after they have been operated, as already described, and so shift the cams back to a central position, and when in this position the pawl 33 (see Fig. 14) engages the notch 36 and holds the switch in such a position that the lugs 27 and 28 are in the position shown in Fig. 13—that is, out of contact with the line-wires A and B—and thus the current is entirely cut out of the contact-rail 16, and the line is consequently perfectly harmless. The arm 48 also carries an auxiliary trolley-wheel $48^a$, running on rail 16 in front of plow 52, said trolley-wheel being connected by a wire $a'$ to the motor 47, so that in case preceding cam does not make proper electrical connections the current can be returned from the front trolley through motor and through rear trolley-wheel before plow 52 shifts cam to a neutral position. The end of the arm 48 is provided with a hook 53, which is engaged by a jointed rod 54, connecting with the lever 55, which is fulcrumed, as shown at 56, on the end of the car, and the hook 53 also connects with a suspending-cord 57, which may be made fast to the hook 58 on the car, and thus support the arm 48 and hold the shift-plate 52 out of contact with the conduit top.

It will be seen that by lifting the lever 55 the shift-plate is raised, and this may be done by either the lever or suspending-cord, and I do not confine the invention to either device, for it is obvious that many simple devices may be used for lifting the shift-plate.

The car is adapted to run first one way and then the other over a line, and it is of course evident that only the rear arm 48 and shift-plate 52 would be used, the other one being raised and fastened, as specified.

In Fig. 15 I have shown a section of the conduit formed into a Y 59 for use where converging conduits meet, and this Y section has at its three ends the flanges 13, already referred to, to enable connections to be conveniently made with the meeting conduit-sections. The wires A and B of the two conduits are brought through the two members of the Y 59 and soldered or otherwise secured together and supported in an insulating-box 29 in the manner already described.

In Fig. 16 I have shown a conduit-section adapted for use where two conduits cross at right angles and where the conduit-section 60, which is placed at the point of intersection of the two conduits, is provided with members which are at right angles to each other, but are in a single piece, and the four ends of this section have the flanges 13, already referred to. The section 60 of the conduit has in the center an insulating-block $29^a$ and the intersecting wires A and B, which cross in this conduit-section and are supported in the insulating-block.

Having thus described my invention, I claim as new and desire to secure by Letters Patent—

1. An electric railway, comprising a conduit having supply and return wires therein, a contact rail, a trolley mounted on the car and arranged to run on the contact rail, switch-devices at intervals along the conduit adapted to connect with the supply and return wires, mechanism carried by the car for operating the switch-devices, and a shifting device carried by the car and adapted to shift the switch-devices to a neutral position, substantially as described.

2. The combination, with the closed conduit, the line wires therein, the contact rail on the conduit, the switches to connect the line wires and the contact rail, a cam device to operate the switches, a shifting device on the car to move the switches to a neutral position, and automatic locking devices to hold the switches in the neutral position, substantially as described.

3. The combination, with the closed conduit, the line wires therein and the switches to engage the wires, of the striking cams on the conduit to operate the switches, the cams having opposite arms, one of which is yielding, substantially as described.

4. The combination, with the conduit, the line wires therein and the switches to engage the wires, of the striking cams connected with the switches, each cam comprising a pair of oppositely arranged arms, one of which is pivoted, and a spring to force the arms apart, substantially as described.

5. The combination, with the conduit, the contact rail thereon, the striking cams and the switches operated by the striking cams, of the trolley to run on the contact rail, the plows to work the switches, and a vertically and laterally movable trailing arm to follow the plows and work the switches, substantially as described.

6. A conduit having parallel longitudinal grooves in its top and having a raised bed between said grooves, and a contact rail secured on said bed, substantially as set forth.

7. A conduit section, having its ends inclined to the plane of its top, substantially as set forth.

8. The combination of a conduit, a contact-rail above the conduit, a shaft electrically connected to the contact-rail and extending into the conduit, a block of insulating material forming a support for the lower end of the shaft, a feed-wire, and a switch device, of which said shaft forms a part, for placing the contact rail in circuit with the feed wire, substantially as set forth.

9. The combination, of a conduit having internal means for holding a block of insulating material, and having a perforation formed in its wall above said holding means, a block of insulating material held in the conduit under the perforation, and a shaft extending through the perforation and supported at its lower end by said block of insulating material, substantially as set forth.

10. The combination, in an electric railway system, of a conduit, lead and return wires, a contact-rail, and a switch device normally held in a neutral position, but adapted to place the contact-rail in circuit with either of the circuit wires, substantially as set forth.

11. The combination of a conduit having a grooved top, lead and return wires, a contact-rail, and a switch-device adapted to place the contact-rail in circuit with either of the line wires, said switch-device having arms extending into said grooves in the conduit-top, substantially as set forth.

12. The combination of a conduit having a grooved top, a line wire, a contact rail, a switch-device for placing said rail in circuit with the line-wire, said switch having an arm extending in said groove, and a plow carried by the car and having a beveled forward end, substantially as set forth.

13. The combination of a conduit, parallel lead and return wires located therein, a switch device having arms adapted, respectively, to contact alternately with said lead and return wires and means located outside the conduit for actuating said switch device, substantially as set forth.

14. The combination of a conduit, lead and return wires, a contact rail, a switch device adapted to place said contact rail alternately in circuit with said lead and return wires, means for actuating said switch device to place the contact rail alternately in circuit with the lead and return wires, and means for returning said switch device to a neutral position, substantially as set forth.

15. The combination of a conduit, parallel lead and return wires therein, a shaft mounted in the conduit, arms on said shaft adapted respectively when the shaft is moved in opposite directions to alternately contact with and be stopped by said lead and return wires, and means for moving said shaft, substantially as set forth.

MICHAEL F. FLYNN.

Witnesses:
MICHAEL KENEALY,
LOUIS J. CURTIS.